United States Patent
Sung et al.

(10) Patent No.: US 12,452,965 B2
(45) Date of Patent: Oct. 21, 2025

(54) HOME APPLIANCE AND COOKING APPLIANCE

(71) Applicant: SAMSUNG ELECTRONICS CO., LTD., Suwon-si (KR)

(72) Inventors: Duckjin Sung, Suwon-si (KR); Yujeub Ha, Suwon-si (KR); Namju Park, Suwon-si (KR); Sunggyun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 975 days.

(21) Appl. No.: 17/518,227

(22) Filed: Nov. 3, 2021

(65) Prior Publication Data

US 2022/0117047 A1  Apr. 14, 2022

Related U.S. Application Data

(63) Continuation of application No. PCT/KR2021/013731, filed on Oct. 6, 2021.

(30) Foreign Application Priority Data

Oct. 14, 2020 (KR) .................. 10-2020-0132374

(51) Int. Cl.
  *H05B 6/12* (2006.01)
  *H05B 6/06* (2006.01)

(52) U.S. Cl.
  CPC .......... *H05B 6/1263* (2013.01); *H05B 6/065* (2013.01); *H05B 6/1272* (2013.01); *H05B 2213/05* (2013.01); *H05B 2213/06* (2013.01)

(58) Field of Classification Search
  CPC .... H05B 6/1263; H05B 6/065; H05B 6/1272; H05B 2213/05; H05B 2213/06
  See application file for complete search history.

(56) References Cited

U.S. PATENT DOCUMENTS 9,199,545 B2   12/2015   Kim et al.
11,015,814 B2   5/2021   Suh et al.
(Continued)

FOREIGN PATENT DOCUMENTS

CN    107466123 A    12/2017
EP    3 612 002 B1    3/2022
(Continued)

OTHER PUBLICATIONS

International Search Report dated Jan. 27, 2022 in PCT Application No. PCT/KR2021/013731.
(Continued)

*Primary Examiner* — Elizabeth M Kerr
*Assistant Examiner* — Keith Brian Assante
(74) *Attorney, Agent, or Firm* — STAAS & HALSEY LLP

(57) ABSTRACT

A home appliance includes a case having a first seating portion and a second seating portion, a first coil arranged in the first seating portion and configured to generate induced current to the first seating portion, a second coil arranged in the second seating portion and configured to generate induced current to the second seating portion and having a height lower than a height of the first seating portion, a first inverter arranged in the first seating portion and to supply driving current to the first coil to cause the first coil to generate the induced current, and a second inverter arranged in the first seating portion and to supply driving current to the second coil to cause the second coil to generate the induced current.

17 Claims, 11 Drawing Sheets

(56) References Cited

U.S. PATENT DOCUMENTS

| | | | | |
|---|---|---|---|---|
| 2015/0069847 A1* | 3/2015 | Meyer | ............... | H04B 5/79 |
| | | | | 307/104 |
| 2017/0257913 A1* | 9/2017 | Vengroff | ............. | H05B 6/1263 |
| 2019/0387585 A1* | 12/2019 | Cho | ............... | H05B 6/065 |
| 2020/0337121 A1* | 10/2020 | Lee | ............... | G06F 3/04883 |
| 2021/0153308 A1* | 5/2021 | Jung | ............... | H05B 6/062 |
| 2021/0307124 A1* | 9/2021 | Suga | ............... | H02M 7/537 |
| 2022/0201809 A1* | 6/2022 | Jung | ............... | H05B 6/40 |
| 2022/0201810 A1* | 6/2022 | Han | ............... | G06F 1/3206 |
| 2022/0394825 A1* | 12/2022 | Park | ............... | H05B 6/1236 |
| 2023/0012630 A1* | 1/2023 | Son | ............... | H05B 6/1209 |

FOREIGN PATENT DOCUMENTS

| | | |
|---|---|---|
| JP | 2003-297539 | 10/2003 |
| JP | 4196098 | 12/2008 |
| JP | 4889372 | 3/2012 |
| JP | 5313334 B2 | 10/2013 |
| JP | 7038520 | 3/2022 |
| KR | 10-2011-0092891 A | 8/2011 |
| KR | 10-2016-0123672 | 10/2016 |
| KR | 10-2017-0053947 | 5/2017 |
| KR | 10-2017-0111363 A | 10/2017 |
| KR | 10-2020-0021755 | 3/2020 |
| KR | 10-2020-0116712 A | 10/2020 |
| WO | WO 2018/042941 A1 | 3/2018 |

OTHER PUBLICATIONS

Korean Office Action Dec. 12, 2022 in Korean Patent Application No. 10-2018-0104007 (4 pages; 6 pages English translation).

\* cited by examiner

HOME APPLIANCE AND COOKING APPLIANCE

CROSS-REFERENCE TO RELATED APPLICATIONS

This application is a continuation application, under 35 U.S.C. § 111(a), of International Patent Application No. PCT/KR2021/013731, filed on Oct. 6, 2021, which claims the priority benefit of Korean Patent Application No. 10-2020-0132374, filed on Oct. 14, 2020 in the Korean Patent and Trademark Office, the disclosures of which are hereby incorporated by reference in their entirety.

BACKGROUND

1. Field

The disclosure relates to a home appliance and a cooking appliance, and more specifically, to a home appliance and a cooking appliance having a plurality of seating portions.

2. Description of Related Art

A kitchen is a space used for cooking food while having various home appliances for cooking food. Specifically, in a kitchen, an induction for heating food in an induction heating method, an electric pot for heating water, a blender for grinding food, and a microwave oven for heating food using electromagnetic waves may be provided. In addition, as needed, a kitchen may be provided with a baby bottle sterilizer for infants, a milk powder port, etc. and recently, has been provided with an air fryer capable of cooking crispy fried dishes with high-temperature air without oil.

Because such appliances are usually arranged in the kitchen with respective wires connected to a multi-tap, the wires need to be organized.

Meanwhile, among the kitchen appliances, an induction may include a coil for generating an induced current, a printed circuit board (PCB) for controlling the coil, and a fan for cooling the coil and the PCB. The induction may include a plurality of seating portions on which a cooking vessel is seated. However, because the PCB and the fan are arranged on each of the plurality of seating portions, the induction is caused to have a relatively great height.

SUMMARY

Therefore, it is an aspect of the disclosure to provide a home appliance and a cooking appliance capable of lowering the height of some of a plurality of seating portions.

It is another aspect of the disclosure to provide a home appliance and a cooking appliance with improved safety of use.

It is another aspect of the disclosure to provide provides a home appliance and a cooking appliance with increased convenience of use.

According to an aspect of the disclosure a home appliance including: a case having a first seating portion and a second seating portion having a height lower than a height of the first seating portion; a first coil arranged in the first seating portion and configured to generate induced current to the first seating portion; a second coil arranged in the second seating portion and configured to generate induced current to the second seating portion; a first inverter arranged in the first seating portion and to supply driving current to the first coil to cause the first coil to generate the induced current; and a second inverter arranged in the first seating portion and to supply driving current to the second coil to cause the second coil to generate the induced current.

The home appliance may further include: a first inverter controller arranged in the first seating portion and configured to control the first inverter; and a second inverter controller arranged in the first seating portion and configured to control the second inverter.

The home appliance may further include a foreign object detector arranged in the second seating portion and configured to detect a foreign object on the second seating portion, wherein the second inverter controller may be configured to control the second inverter to block the induced current generated from the second coil based on information detected by the foreign object detector.

The home appliance further comprises a detector controller arranged in the first seating portion, the detector controller configured to control the foreign object detector, receive the information from the foreign object detector and transmit the information to the second inverter controller.

The home appliance further comprises a near field communication (NFC) antenna arranged in the second seating portion and configured to detect an electronic device seated on the second seating portion, wherein the second inverter controller may control the second inverter to adjust the induced current generated from the second coil based on information acquired by the NFC antenna.

The home appliance further comprises a NFC controller arranged in the first seating portion, the NFC controller configured to control the NFC antenna, receive the information from the NFC antenna and transmit the information to the second inverter controller.

The home appliance may further include a fan arranged in the first seating portion and configured to cool the first coil and the second coil.

The first seating portion may include an inlet through which external air is suctioned by the fan, and the second seating portion may include an outlet through which the air introduced through the inlet is discharged.

An inside of the first seating portion may be provided to communicate with an inside of the second seating portion.

The home appliance may further include a heat sink configured to dissipate heat generated by the first inverter or the second inverter.

The second seating portion may be attachable to or detachable from the first seating portion.

The first seating portion may include a first connector and the second seating portion may include a second connector electrically connectable to the first seating portion.

The home appliance may further include a third seating portion arranged between the first seating portion and the second seating portion, the third seating portion having a height lower than a height of the first seating portion and a third coil arranged in the third seating portion and configured to generate induced current.

The home appliance further comprises a foreign object detector arranged in the second seating portion and configured to detect a foreign object on the second seating portion, a near field communication (NFC) antenna arranged in the second seating portion and configured to detect a device seated on the second seating portion, and a detector controller arranged in the third seating portion and configured to control the foreign object detector and an NFC controller arranged in the third seating portion and configured to control the NFC antenna.

The home appliance further comprises a foreign object detector arranged in the first seating portion and configured to detect a foreign object on the first seating portion, and a near field communication (NFC) antenna arranged in the first seating portion and configured to detect a device seated on the first seating portion.

A home appliance comprising: a case having a first seating portion and a second seating portion; a first coil arranged in the first seating portion, the first coil configured to generate induced current to the first seating portion; a second coil arranged in the second seating portion, the second coil configured to generate induced current to the second seating portion; a first inverter arranged in the first seating portion and to supply driving current to the first coil to cause the first coil to generate the induced current; a second inverter arranged in the first seating portion and to supply driving current to the second coil to cause the second coil to generate the induced current, a wireless module arranged in one of the first seating portion or the second seating portion, and configured to detect a wireless device when the wireless device is seated on the one of the first seating portion and the second seating portion; and a processor configured to control one of the first inverter and the second inverter, corresponding to the one of the first seating portion and the second seating portion, to adjust an amount of the driving current to wirelessly supply power to the wireless device when the wireless device is detected, or to heat the cooking vessel when a cooking vessel is seated on the one of the first seating portion and the second seating portion.

The second seating portion has a height lower than a height of the first seating portion.

The wireless module is arranged in an other one of the first seating portion and the second seating portion, and configured to detect the wireless device when the wireless device is seated on the other one of the first seating portion and the second seating portion; and a processor configured to control an other one of the first inverter and the second inverter, corresponding to the other one of the first seating portion and the second seating portion, to adjust an amount of the driving current to wirelessly supply power to the wireless device when the wireless device is detected, or to heat the cooking vessel when the cooking vessel is seated on the other one of the first seating portion and the second seating portion.

According to another aspect of the disclosure, there is provided a home appliance including: a first seating portion having a first height and a second seating portion having a second height lower than the first height, in which the first portion is provided with a first coil configured to generate induced current, a first inverter configured to supply driving current to the first coil, a first foreign object detector configured to detect a foreign object on the first seating portion, and a first near field communication (NFC) antenna configured to detect an electronic device seated on the first seating portion, and the second seating portion is provided with a second coil configured to generate induced current, a second foreign object detector configured to detect a foreign object on the second seating portion, and a second near field communication (NFC) antenna configured to detect an electronic device seated on the second seating portion, in which the first seating portion is provided with a second inverter configured to supply driving current to the second coil, a first detector controller configured to control the first foreign object detector, a second detector controller configured to control the second foreign object detector, a first NFC controller configured to control the first NFC antenna, and a second NFC controller configured to control the second NFC antenna.

The first seating portion may be provided with a heat dissipation member configured to dissipate heat of the first inverter or the second inverter.

The first seating portion may be formed with an inlet, and the second seating portion may be formed with an outlet, and the first seating portion may be provided with a cooling device configured to suction air through the inlet and discharge the suctioned air through the outlet.

The second seating portion may be separably provided from the first seating portion, and the first seating portion may be provided with a first connector and a first connection port, and the second seating portion may be provided with a second connector electrically connected to the first connector and a second connection port communicatively connected with the first connection port.

According to another aspect of the disclosure, there is provided a cooking appliance including: a first seating portion provided with a first coil that generates induced current and formed with an inlet; a second seating portion having a height lower than a height of the first seating portion and provided with a second coil that generates induced current and formed with an outlet; a first inverter arranged in the first seating portion and configured to supply driving current to the first coil; a second inverter arranged in the first seating portion and configured to supply driving current to the second coil; and a cooling device arranged in the first seating portion and configured to suction air through the inlet and discharge the suctioned air through the outlet.

According to an aspect of the disclosure, the home appliance and the cooking appliance allow the PCB and the fan to be arranged only on the first seating portion, so that the height of the second seating portion can be relatively lowered.

According to an aspect of the disclosure, the home appliance and the cooking appliance provide the second seating portion with a relatively lowered height, so that the safety of using a product seated on the second seating portion can be improved.

According to an aspect of the disclosure, the home appliance and the cooking appliance allow an inverter controller to control an inverter based on information acquired by a near field communication (NFC) antenna for an electronic device seated on a seating portion, so that the convenience of use can be improved.

BRIEF DESCRIPTION OF DRAWINGS

The above and other aspects, features and advantages of the disclosure will become more apparent from the following description of example embodiments with reference to the accompanying drawings, in which.

MODE FOR INVENTION

Figure 1:
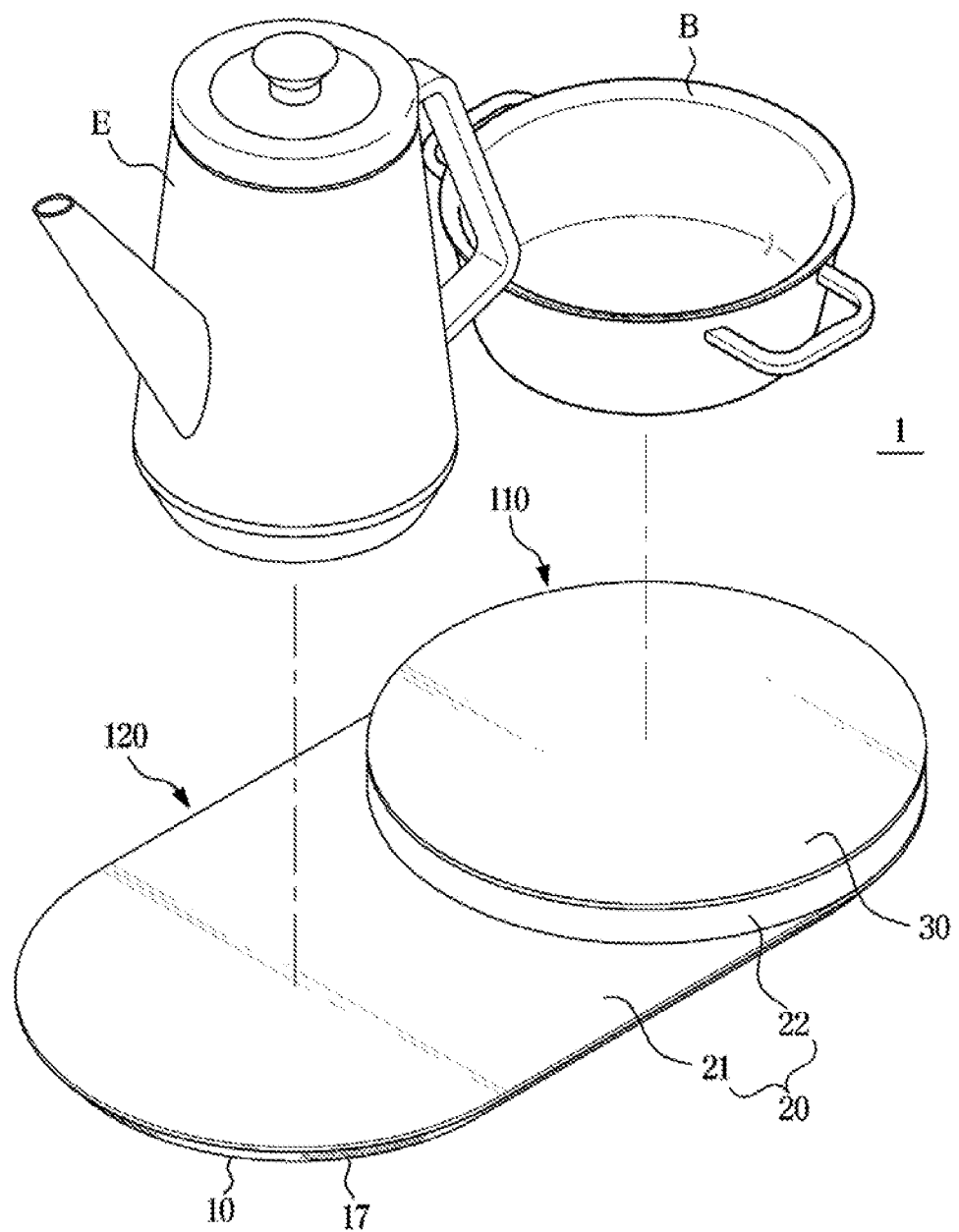
FIG. 1 is a view illustrating a home appliance according to an embodiment of the disclosure.

The embodiments set forth herein and illustrated in the configuration of the disclosure are only preferred embodiments, so it should be understood that they may be replaced with various equivalents and modifications at the time of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

Figure 2:
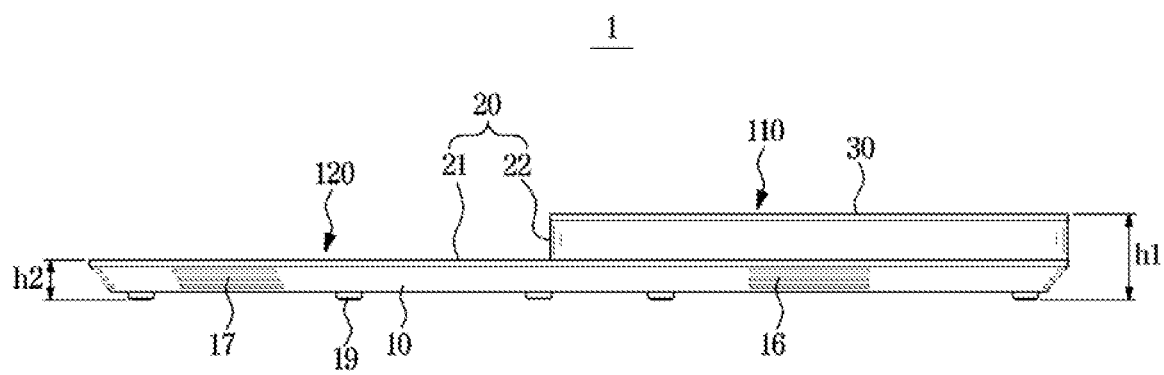
FIG. 2 is a view illustrating the home appliance shown in FIG. 1 from one side.
Figure 3:
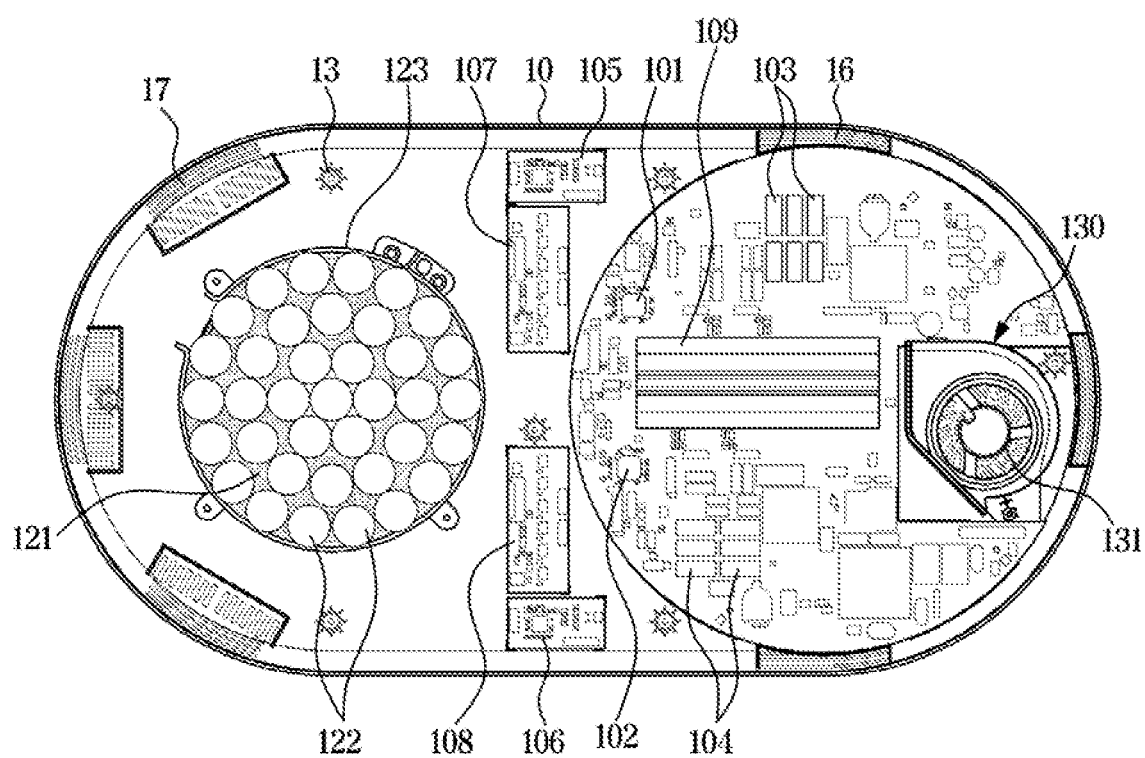
FIG. 3 is a view illustrating some internal components of the home appliance shown in FIG. 1.
Figure 4:
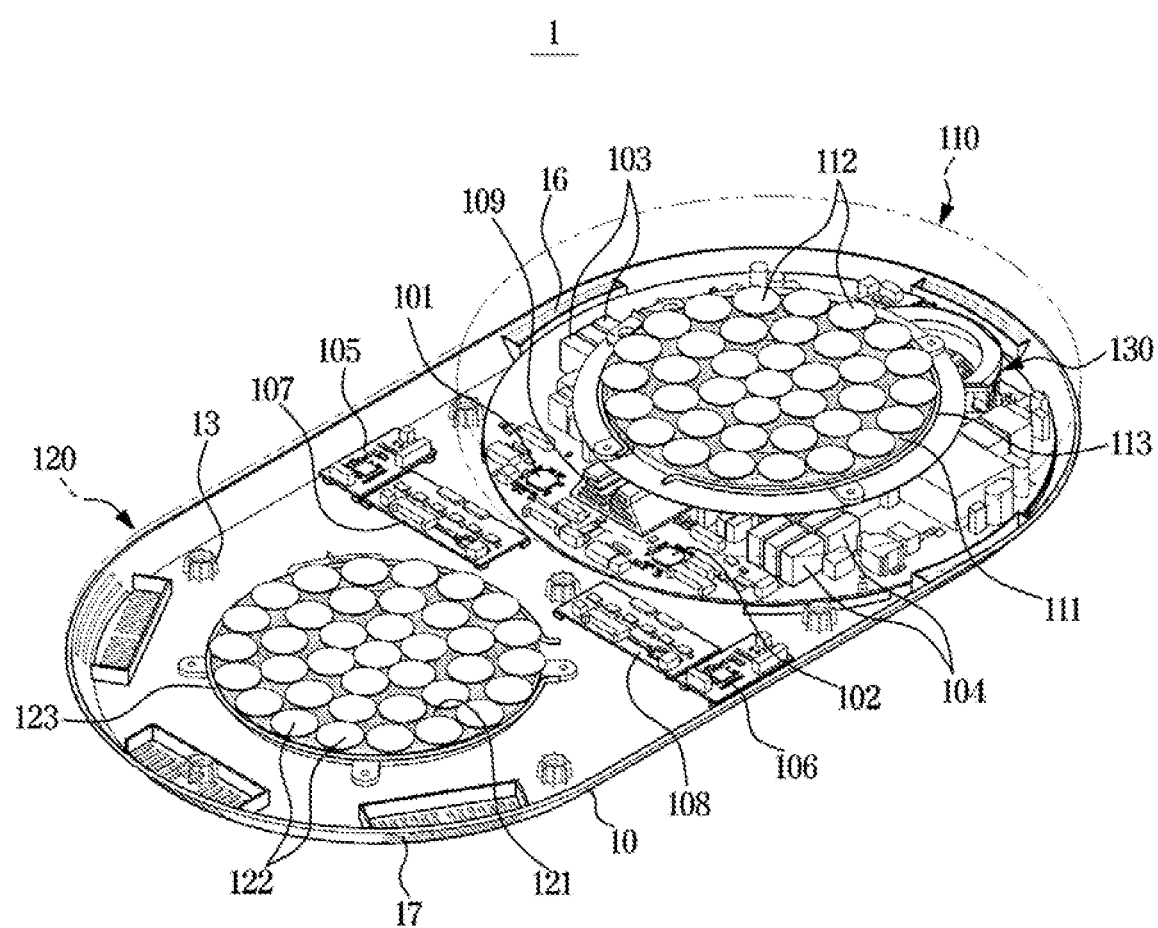
FIG. 4 is a view illustrating the inside of the home appliance shown in FIG. 1.

FIG. 1 is a view illustrating a home appliance according to an embodiment of the disclosure. FIG. 2 is a view illustrating the home appliance shown in FIG. 1 from one side. FIG. 3 is a view illustrating some internal components of the home appliance shown in FIG. 1. FIG. 4 is a view illustrating the inside of the home appliance shown in FIG. 1.

Referring to FIGS. 1 and 2, a home appliance 1 may be provided to heat a cooking vessel B or wirelessly supply power to an electronic device E. FIG. 1 illustrates an electric pot as an example of the electronic device E, but the electronic device E may include a toaster, a blender, an electric rice cooker, a baby bottle sterilizer, a milk powder pot, etc. available for use in a kitchen. In addition, the electronic device E may include a mobile phone, a tablet personal computer (PC), and the like.

The home appliance 1 may include a case 10, a cover 20 mounted on an upper side of the case 10, and a cover lid 30 mounted on an upper side of the cover 20. The home appliance 1 may include a first seating portion 110 and a second seating portion 120. The inside of the first seating portion 110 and the inside of the second seating portion 120 may be provided to communicate with each other.

The case 10 may be provided to accommodate electronic parts. The case 10 may form the first seating portion 110 and the second seating portion 120 together with the cover 20 and the cover lid 30.

The case 10 may have an inlet 16 and an outlet 17 formed therein. External air may be introduced into the case 10 through the inlet 16. Air inside the case 10 may be discharged to the outside through the outlet 17. The inlet 16 may be located in the first seating portion 110. The outlet 17 may be located in the second seating portion 120.

A case support 19 may be provided on the bottom surface of the case 10. The case support 19 may be provided to have a large frictional force with respect to the floor to prevent the home appliance 1 placed on the floor from sliding.

The case 10 may include a cover fixing portion 13 to which the cover 20 is coupled. The cover fixing portion 13, in a state in which the cover 20 is placed to cover the upper surface of the case 10, may be inserted around a fastening member (not shown) to thereby fix the cover 20 to the case 10.

The cover 20 may be provided to cover a part of the upper surface of the case 10. The cover 20 may include a cover portion 21 forming the second seating portion 120 and a lid mounting portion 22 forming the first seating portion 110 together with the cover lid 30.

The cover portion 21 may be provided to cover a part of the upper surface of the case 10 except for a part corresponding to the first seating portion 110. The cover portion 21 may be formed flat such that the home appliance may be seated on the upper surface of the cover portion 21.

The lid mounting portion 22 may formed to protrude upward from the cover portion 21. The lid mounting portion 22 may extend in a direction distant away from the case 10. Electronic parts may be accommodated in the lid mounting portion 22. The cover lid 30 may be mounted on the lid mounting portion 22.

The cover lid 30 may be provided to cover a part of the upper surface of the case 10 except for a part covered by the cover portion 21. The cover lid 30 may be mounted on the lid mounting portion 22 of the cover 20. The cover lid 30 may be provided to cover an open part of the lid mounting portion 22. The cover lid 30 may form the first seating portion 110.

Referring to FIG. 2, the first seating portion 110 may have a first height h1, and the second seating portion 120 may have a second height h2. The first height h1 may be greater than the second height h2. More electronic parts may be arranged inside the first seating portion 110 than inside the second seating portion 120. Because the second seating portion 120 has a lower height than the first seating portion 110, the home appliance 1 according to the embodiment of the disclosure may be used with an improved safety while other home appliances is seated on the second seating portion 120.

Referring to FIGS. 3 and 4, in the first seating portion 110 of the home appliance 1, inverter controllers 101 and 102 and inverters 103 and 104 may be provided.

The inverter controllers 101 and 102 may include a first inverter controller 101 and a second inverter controller 102. The inverters 103 and 104 may include a first inverter 103 and a second inverter 104. The first inverter controller 101 may be provided to control the first inverter 103. The second inverter controller 102 may be provided to control the second inverter 104.

The first inverter 103 may be provided to supply driving current to a first coil 111 provided in the first seating portion 110. The first inverter 103 may include a first inverter switch (not shown) that allows or blocks the supply of driving current to the first coil 111 and a first capacitor (not shown) that causes resonance together with the first coil 111.

The second inverter 104 may be provided to supply driving current to a second coil 121 provided in the second seating portion 120. The second inverter 104 may include a second inverter switch (not shown) that allows or blocks the supply of driving current to the second coil 121 and a second capacitor (not shown) that causes resonance together with the second coil 121.

Near field communication (NFC) controllers 105 and 106 may be provided in the first seating portion 110. The NFC controllers 105 and 106 may include a first NFC controller 105 and a second NFC controller 106. The first NFC controller 105 may be provided to control a first NFC antenna 113 provided in the first seating portion 110. The second NFC controller 106 may be provided to control a second NFC antenna 123 provided in the second seating portion 120.

Detector controllers 107 and 108 may be provided in the first seating portion 110. The detector controllers 107 and 108 may include a first detector controller 107 and a second detector controller 108. The first detector controller 107 may be provided to control a first foreign object detector 112 provided in the first seating portion 110. The second detector controller 108 may be provided to control a second foreign object detector 122 provided in the second seating portion 120.

A heat dissipation member 109 may be provided in the first seating portion 110. The heat dissipation member 109 may be provided to prevent the temperature of the electronic parts arranged in the first seating portion 110 from rising. The heat dissipation member 109 may be provided to absorb heat from at least one of the inverter controllers 101 and 102, the inverters 103 and 104, the NFC controllers 105 and 106, and the detector controllers 107 and 108. The heat dissipation member 109 may include a heat sink.

A cooling device 130 may be provided in the first seating portion 110. The cooling device 130 may include a fan 131. As the fan 131 is driven, the cooling device 130 suctions outside air into the case 10 through the inlet 16 and discharges the air to the outside of the case 10 through the outlet 17. The components arranged inside the case 10 may be cooled by the cooling device 130. The cooling device 130 may cool the first coil 111 and/or the second coil 121.

Referring to FIGS. 3 and 4, the first coil 111, the first foreign object detector 112, and the first NFC antenna 113 may be provided in the first seating portion 110.

The first coil 111 may be configured to generate induced current. When driving current is supplied to the first coil 111, a magnetic field may be induced around the first coil 111. When a cooking vessel B is seated on the first seating portion 110, the first coil 111 may heat the cooking vessel B using electromagnetic induction phenomenon and electric heat. When an electronic device E is seated on the first seating portion 110, the first coil 111 is controlled to be impedance-matched with the electronic device E such that power may be wirelessly supplied to the electronic device E. In other words, based on the first inverter controller 101 controlling the operation of the first inverter 103, the first coil 111 may heat the cooking vessel B seated on the first seating portion 110, or may wirelessly supply power to the electronic device E seated on the first seating portion 110.

The first foreign object detector 112 may detect whether a foreign object exists on the first seating portion 110. In response to the existence of a foreign object on the first seating portion 110 being detected by the first foreign object detector 112, the first detector controller 107 electrically connected to the first foreign object detector 112 may control the first inverter controller 101 to stop the operation of the first inverter 103 based on information about the detection. That is, the first inverter controller 101 may receive the information detected by the first foreign object detector 112 through the first detector controller 107 and control the first inverter 103 to block the induced current generated from the first coil 111. With the first foreign object detector 112, the home appliance 1 according to the embodiment of the disclosure may prevent malfunction from occurring when a foreign object is present on the first seating portion 110.

The first NFC antenna 113 is a short-range wireless communication module, and may wirelessly perform data communication with the electronic device E seated on the first seating portion 110. The first NFC antenna 113 may acquire information about the type of the electronic device E seated on the first seating portion 110. The first NFC antenna 113 may transmit information acquired by wirelessly performing data communication with the electronic device E seated on the first seating portion 110 to the first NFC controller 105. The first NFC controller 105 may cause the first inverter controller 101 to control the first inverter 103 to perform an operation corresponding to the type of the electronic device E seated on the first seating portion 110. That is, the first inverter controller 101 may control the first inverter 103 to adjust the induced current generated from the first coil 111 based on information acquired by the first NFC antenna 113. With the first NFC antenna 113, the home appliance 1 according to the embodiment of the disclosure may allow the first inverter 103 to be driven to correspond to the electronic device E seated on the first seating portion 110, so that the convenience of use may be increased.

In the second seating portion 120, the second coil 121, the second foreign object detector 122, and the second NFC antenna 123 may be provided.

The second coil 121 may be configured to generate induced current. When driving current is supplied to the second coil 121, a magnetic field may be induced around the second coil 121. When a cooking vessel B is seated on the second seating portion 120, the second coil 121 may heat the cooking vessel B using electromagnetic induction phenomenon and electric heat. When an electronic device E is seated on the second seating portion 120, the second coil 121 is controlled to be impedance-matched with the electronic device E such that power may be wirelessly supplied to the electronic device E. In other words, based on the second inverter controller 102 controlling the operation of the second inverter 104, the second coil 121 may heat the cooking vessel B seated on the second seating portion 120, or may wirelessly supply power to the electronic device E seated on the second seating portion 120.

The second foreign object detector 122 may detect whether a foreign object exists on the second seating portion 120. In response to the existence of a foreign object on the second seating portion 120 being detected by the second foreign object detector 122, the second detector controller 108 electrically connected to the second foreign object detector 122 may control the second inverter controller 102 to stop the operation of the second inverter 104 based on information about the detection. That is, the second inverter controller 102 may receive the information detected by the second foreign object detector 122 through the second detector controller 108 and control the second inverter 104 to block the induced current generated in the second coil 121. With the second foreign object detector 122, the home appliance 1 according to the embodiment of the disclosure may prevent malfunction from occurring when a foreign object is present on the second seating portion 120.

The second NFC antenna 123 is a short-range wireless communication module, and may wirelessly perform data communication with the electronic device E seated on the second seating portion 120. The second NFC antenna 123 may acquire information about the type of the electronic device E seated on the second seating portion 120. The second NFC antenna 123 may transmit information acquired by wirelessly performing data communication with the electronic device E seated on the second seating portion 120 to the second NFC controller 106. The second NFC controller 106 may cause the second inverter controller 102 to control the second inverter 104 to perform an operation corresponding to the type of the electronic device E seated on the second seating portion 120. That is, the second inverter controller 102 may control the second inverter 104 to adjust the induced current generated from the second coil 121 based on information acquired by the second NFC antenna 123. With the second NFC antenna 123, the home appliance 1 according to the embodiment of the disclosure may allow the second inverter 104 to be driven to correspond to the electronic device E seated on the second seating portion 120, so that the convenience of use may be increased.

In the home appliance 1 according to the embodiment of the disclosure, the first coil 111 may be provided to heat the cooking vessel B and wirelessly supply power to the electronic device E, and the second coil 121 may be provided to heat the cooking vessel B and wirelessly supply power to the electronic device E. That is, the home appliance 1 may function as a cooking appliance.

Alternatively, in the home appliance 1 according to the embodiment of the disclosure, the first coil 111 may be provided to heat the cooking vessel B and wirelessly supply power to the electronic device E, but the second coil 121 may be provided to only wirelessly supply power to the electronic device E. That is, the home appliance 1 may function as a cooking appliance.

Alternatively, in the home appliance 1 according to the embodiment of the disclosure, the first coil 111 may be provided to only wireless supply power to the electronic device E, and the second coil 121 may be provided to heat the cooking vessel B and wirelessly supply power to the electronic device E. That is, the home appliance 1 may function as a cooking appliance.

Alternatively, in the home appliance 1 according to the embodiment of the disclosure, the first coil 111 and the second coil 121 may be provided to only wirelessly supply power to the electronic device E.

Figure 5:
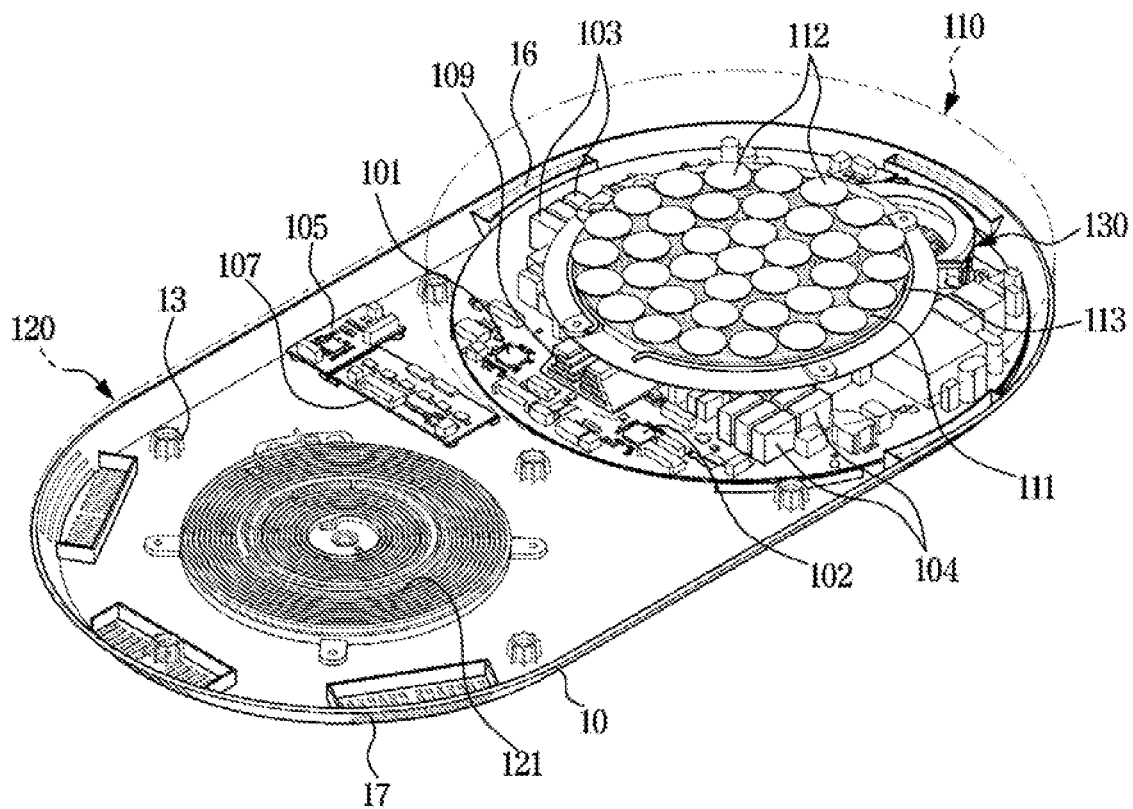
FIG. 5 is a view illustrating the inside of a home appliance according to an embodiment of the disclosure.

FIG. 5 is a view illustrating the inside of a home appliance according to an embodiment of the disclosure.

Referring to FIG. 5, a home appliance 2 according to an embodiment of the disclosure will be described. However, the same reference numerals are assigned to the same components as those of the home appliance 1 according to the embodiment shown in FIGS. 3 and 4, and detailed descriptions thereof may be omitted.

Referring to FIG. 5, the home appliance 2 according to the embodiment of the disclosure may exclude the second foreign object detector 122 and the second NFC antenna 123 arranged in the second seating portion 120 of the home appliance 1 shown in FIGS. 3 and 4, and accordingly, the second detector controller 108 and the second NFC controller 106 arranged in the first seating portion 110 may be excluded.

With such a configuration, the home appliance 2 according to the embodiment of the disclosure may be provided such that the first coil 111 may heat the cooking vessel B and wirelessly supply power to the electronic device E but the second coil 121 may only heat the cooking vessel B. That is, the home appliance 2 may function as a cooking appliance.

Alternatively, the home appliance 2 according to the embodiment of the disclosure may be provided such that the first coil 111 may only wirelessly supply power to the electronic device E, and the second coil 121 may only heat the cooking vessel B.

Figure 6:
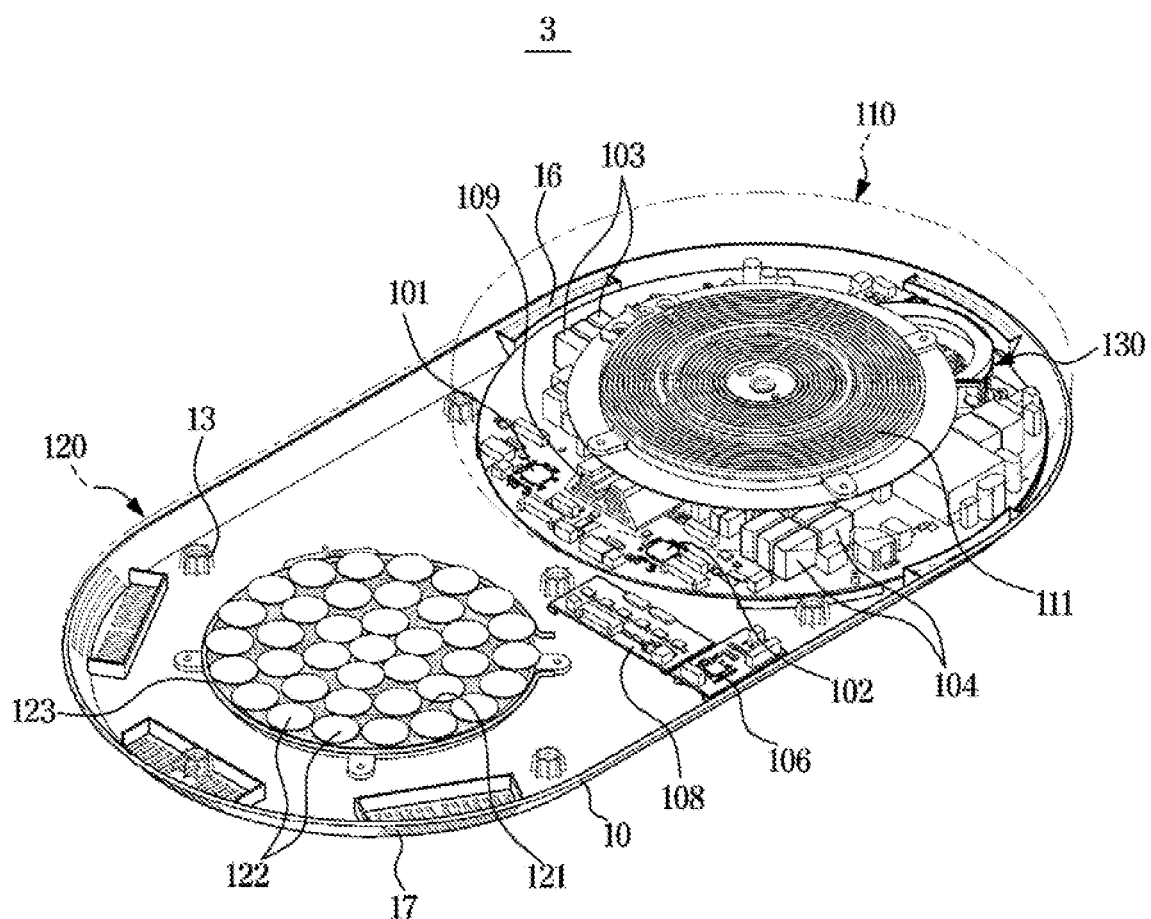
FIG. 6 is a view illustrating the inside of a home appliance according to an embodiment of the disclosure.

FIG. 6 is a view illustrating the inside of a home appliance according to an embodiment of the disclosure.

Referring to FIG. 6, a home appliance 3 according to an embodiment of the disclosure will be described. However, the same reference numerals are assigned to the same components as those of the home appliance 1 according to the embodiment shown in FIGS. 3 and 4, and detailed descriptions thereof may be omitted.

Referring to FIG. 6, the home appliance 3 according to the embodiment of the disclosure may exclude the first foreign object detector 112 and the first NFC antenna 113 arranged in the first seating portion 110 of the home appliance 1 shown in FIGS. 3 and 4, and accordingly, the first detector controller 106 and the first NFC controller 105 arranged in the first seating portion 110 may be excluded.

With such a configuration, the home appliance 3 according to the embodiment of the disclosure may be provided such that the first coil 111 may only heat the cooking vessel B, and the second coil 121 may heat the cooking vessel B and wirelessly supply power to the electronic device E. That is, the home appliance 3 may function as a cooking appliance.

Alternatively, the home appliance 3 according to the embodiment of the disclosure may be provided such that the first coil 111 may only heat the cooking vessel B, and the second coil 121 may only wirelessly supply power to the electronic device E.

Figure 7:
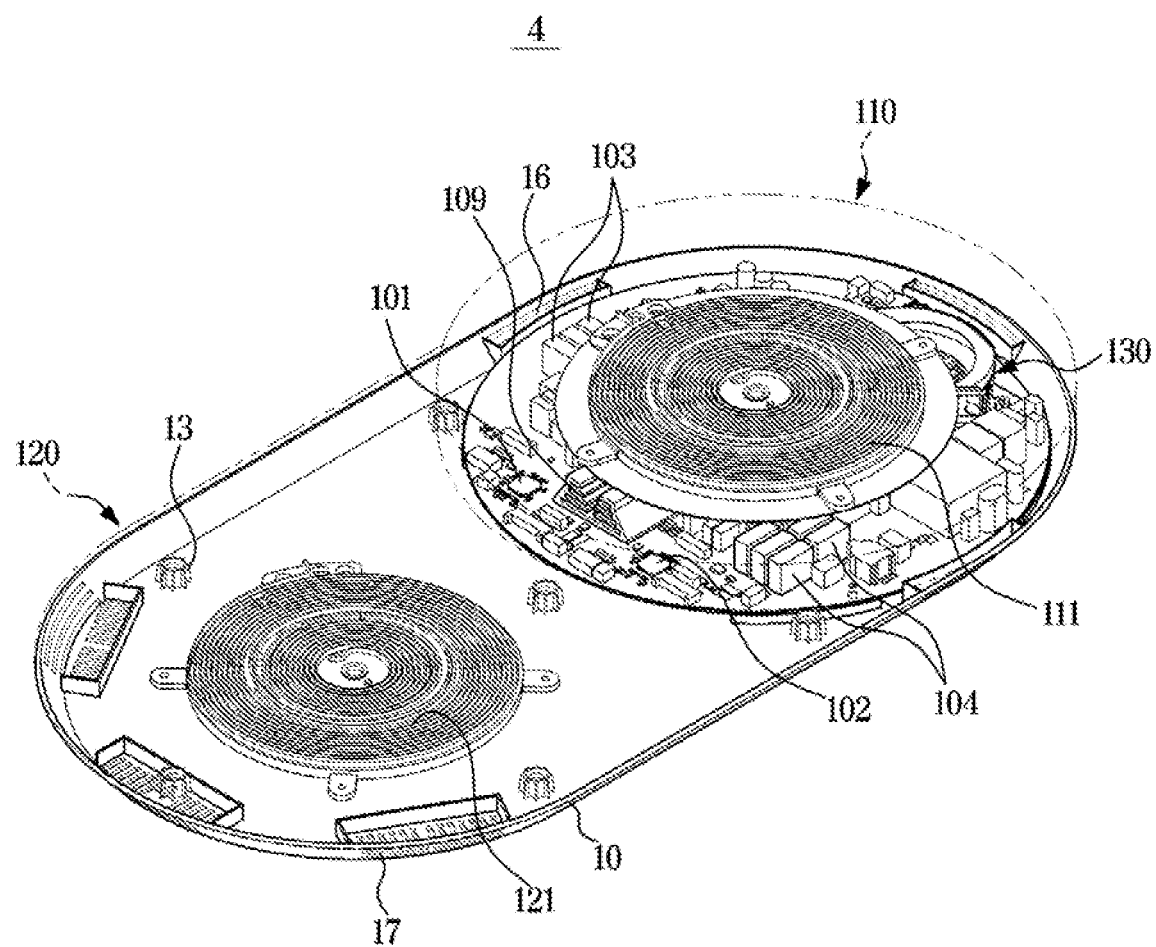
FIG. 7 is a view illustrating the inside of a home appliance according to an embodiment of the disclosure.

FIG. 7 is a view illustrating the inside of a home appliance according to still another embodiment of the disclosure.

Referring to FIG. 7, a home appliance 4 according to an embodiment of the disclosure will be described. However, the same reference numerals are assigned to the same components as those of the home appliance 1 according to the embodiment shown in FIGS. 3 and 4, and detailed descriptions thereof may be omitted.

Referring to FIG. 7, a home appliance 4 according to an embodiment of the disclosure may exclude the first foreign object detector 112 and the first NFC antenna 113 arranged in the first seating portion 110 of the home appliance 1 and the second foreign object detector 122 and the second NFC antenna 123 arranged in the second seating portion 120 of the home appliance 1 described in FIGS. 3 and 4, and accordingly, the first detector controller 106, the second detector controller 108, the first NFC controller 105, and the second NFC controller 106 arranged in the first seating portion 110 may be omitted.

With such a configuration, the home appliance 4 according to the embodiment of the disclosure may be provided such that the first coil 111 may only heat the cooking vessel B, and the second coil 121 also may only heat the cooking vessel B. That is, the home appliance 4 may function as a cooking appliance.

Figure 8:
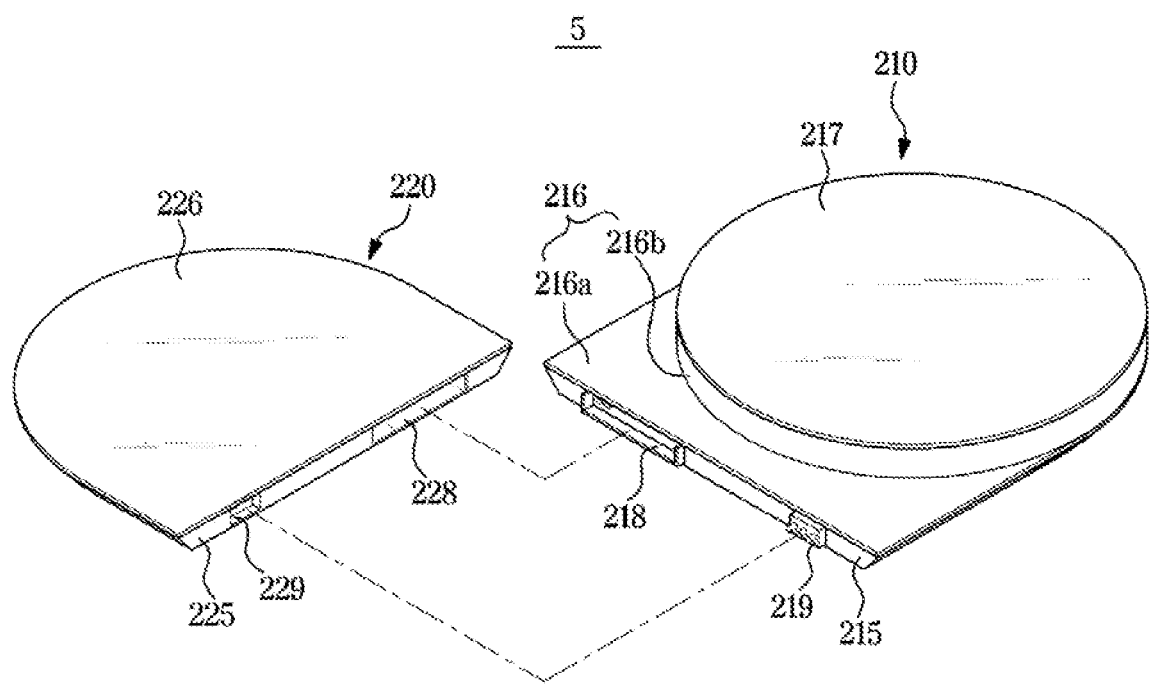
FIG. 8 is a view illustrating a state in which a first seating portion and a second seating portion of a home appliance are separated from each other according to an embodiment of the disclosure.
Figure 9:
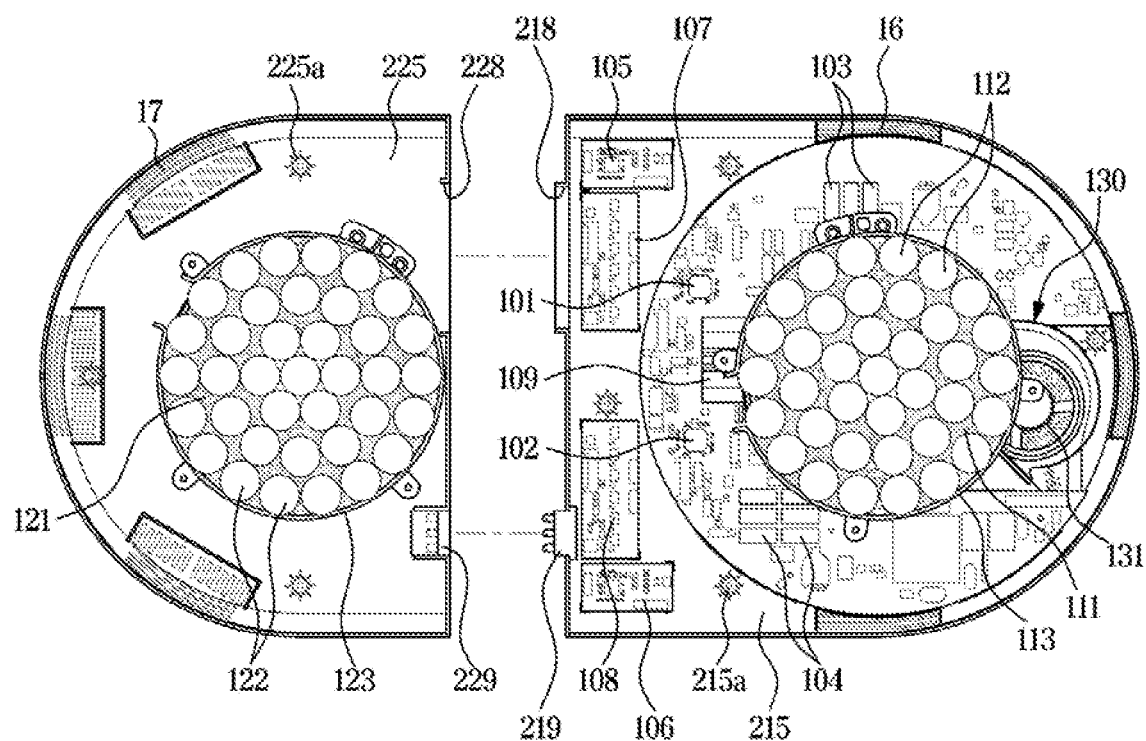
FIG. 9 is a view illustrating the inside of the home appliance shown in FIG. 8.

FIG. 8 is a view illustrating a state in which a first seating portion and a second seating portion of a home appliance are separated from each other according to an embodiment of the disclosure. FIG. 9 is a view illustrating the inside of the home appliance shown in FIG. 8.

Referring to FIGS. 8 and 9, a home appliance 5 according to an embodiment of the disclosure will be described. However, the same reference numerals are assigned to the same components as those of the home appliance 1 according to the embodiment shown in FIGS. 3 and 4, and detailed descriptions thereof may be omitted.

Referring to FIGS. 8 and 9, a second seating portion 220 may be provided to be detachable from a first seating portion 210.

The first seating portion 210 may include a first case 215, a first cover 216, and a first cover lid 217. The first cover 216 may include a cover portion 216a and a lid mounting portion 216b. The first case 215 may include a first cover fixing portion 215a for fixing the first cover 216.

The second seating portion 220 may include a second case 225 and a second cover 226. The second case 225 may include a second cover fixing portion 225a for fixing the second cover 226.

The first seating portion 210 may include a first connection port 218, and the second seating portion 220 may include a second connection port 228 provided to communicate with the first connection port 218. The first seating portion 210 and the second seating portion 220 may communicate with each other through the first connection port 218 and the second connection port 228. Accordingly, external air introduced through the inlet 16 may pass through the first and second seating portions 210 and 220 and then flow out through the outlet 17.

The first seating portion 210 may include a first connector 219, and the second seating portion 220 may include a second connector 229 provided to be electrically connected to the first connector 219. The first seating portion 210 and the second seating portion 220 may be electrically connected to each other through the first connector 219 and the second connector 229. Accordingly, the second seating portion 220 may receive power from the first seating portion 210.

Figure 10:
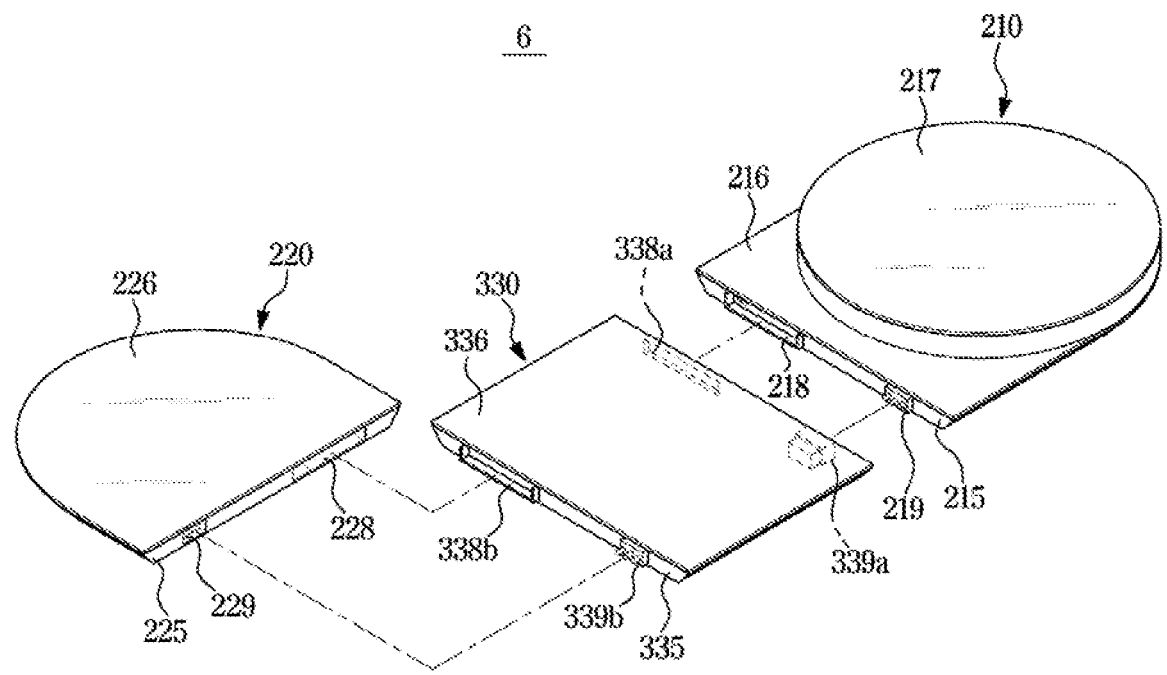
FIG. 10 is a view illustrating a state in which a first seating portion, a second seating portion, and a third seating portion of a home appliance according to an embodiment of the disclosure are separated from each other.
Figure 11:
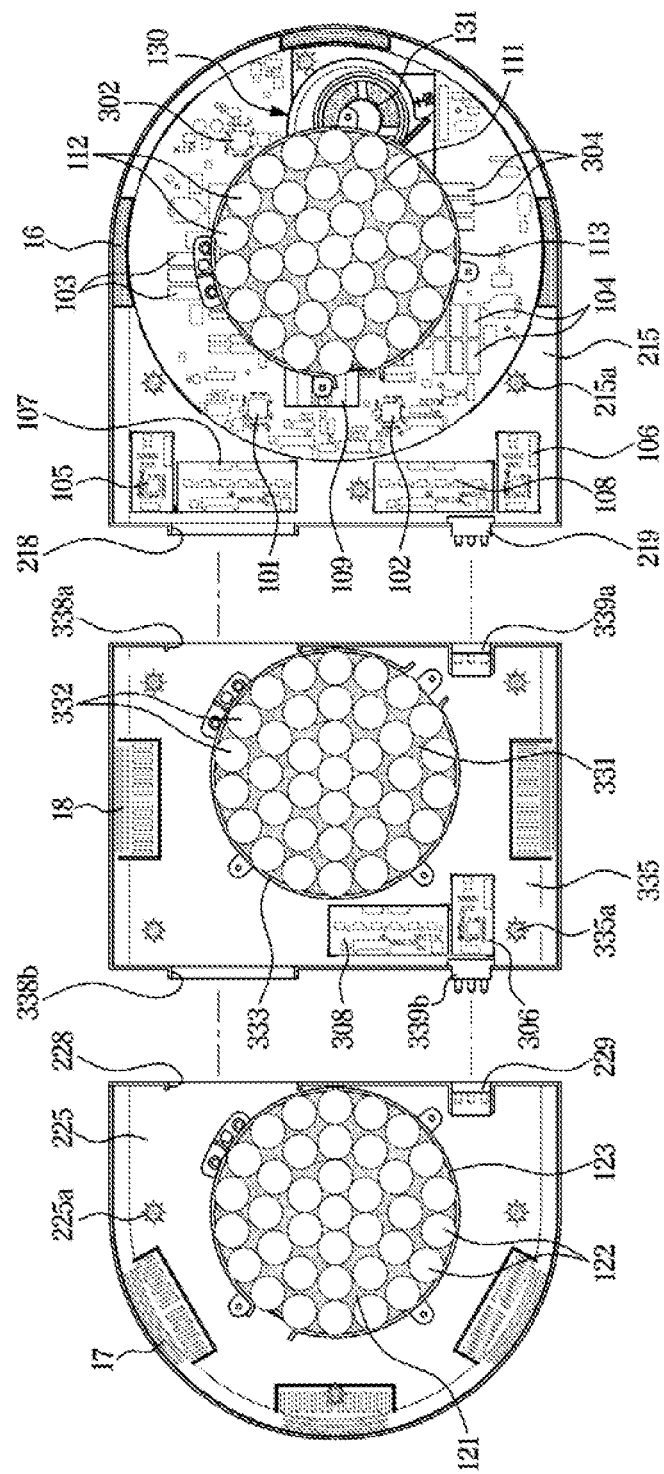
FIG. 11 is a view illustrating the inside of a home appliance shown in FIG. 10.

FIG. 10 is a view illustrating a state in which a first seating portion, a second seating portion, and a third seating portion of a home appliance according to an embodiment of the disclosure are separated from each other. FIG. 11 is a view illustrating the inside of a home appliance shown in FIG. 10.

Referring to FIGS. 10 and 11, a home appliance 6 according to an embodiment of the disclosure will be described. However, the same reference numerals are assigned to the same components as those of the home appliance 5 according to the embodiment shown in FIGS. 8 and 9, and detailed descriptions thereof may be omitted.

Referring to FIGS. 10 and 11, the home appliance 6 may further include a third seating portion 330 provided between the first seating portion 210 and the second seating portion 220.

The third seating portion 330 may include a third case 335 and a third cover 336. The third case 335 may include a third cover fixing portion 335a for fixing the third cover 336.

The third seating portion 210 may include a third-A connection port 338a and a third-B connection port 338b. The third-A connection port 338a may be connected to the first connection port 218 of the first seating portion 210. The third-B connection port 338b may be connected to the second connection port 228 of the second seating portion 220. The third seating portion 330 may communicate with the first seating portion 210 through the third-A connection port 338a and the first connection port 218. The third-B connection port 338b may be connected to the second connection port 228 of the second seating portion 220. The third seating portion 330 may communicate with the second seating portion 220 through the third-B connection port 338b and the second connection port 228. The third seating portion 330 may include an intermediate outlet 18. With such a configuration, external air introduced through the inlet 16 may sequentially pass through the first seating portion 210, the third seating portion 330, and the second seating portion 220, during which the air may be discharged to the outside through the intermediate outlet 18 and the outlet 17.

The third seating portion 330 may include a third-A connector 339a and a third-B connector 339b. The third-A connector 339a may be electrically connected to the first connector 219 of the first seating portion 210. The third-B connector 339b may be electrically connected to the second connector 229 of the second seating portion 220. The third seating portion 330 may be electrically connected to the first seating portion 210 through the third-A connector 339a and the first connector 219. The third seating portion 330 may be electrically connected to the second seating portion 220 through the third-B connector 339b and the second connector 229. With such a configuration, the third seating portion 330 may receive power from the first seating portion 210, and the second seating portion 220 may receive power through the third seating portion 330.

In the third seating portion 330, a third coil 331, a third foreign object detector 332, and a third NFC antenna 333 may be provided.

The third coil 331 may be configured to generate induced current. When driving current is supplied to the third coil 331, a magnetic field may be induced around the third coil 331. When a cooking vessel B is seated on the third seating portion 330, the third coil 331 may heat the cooking vessel B using electromagnetic induction phenomenon and electric heat. When an electronic device E is seated on the third seating portion 330, the third coil 331 is controlled to be impedance-matched with the electronic device E such that power may be wirelessly supplied to the electronic device E. In other words, based on the third inverter controller 302 controlling the operation of the third inverter 304, the third coil 331 may heat the cooking vessel B seated on the third seating portion 330, or may wirelessly supply power to the electronic device E seated on the third seating portion 330.

The third foreign object detector 332 may detect whether a foreign object exists on the third seating portion 330. The third foreign object detector 332 may be electrically connected to the second detector controller 108 located in the first seating portion 110. Unlike the embodiment shown in FIGS. 3 and 4, the second foreign object detector 122 provided in the second seating portion 220 may be electrically connected to a third detector controller 308 located in the third seating portion 330.

In response to the existence of a foreign object on the third seating portion 330 being detected by the third foreign object detector 332, the second detector controller 108 may control the third inverter controller 302 to stop the operation of the third inverter 304 based on information about the detection. That is, the third inverter controller 302 may receive the information detected by the third foreign object detector 332 through the second detector controller 108 and control the third inverter 304 to block the induced current generated from the third coil 331. With the third foreign object detector 332, the home appliance 6 according to the embodiment of the disclosure may prevent malfunction from occurring when a foreign object is present on the third seating portion 330.

The third NFC antenna 333 is a short-range wireless communication module, and may wirelessly perform data communication with the electronic device E seated on the third seating portion 330. The third NFC antenna 333 may acquire information about the type of the electronic device E seated on the third seating portion 330. The third NFC antenna 333 may be electrically connected to the second NFC controller 106 located in the first seating portion 210. Unlike the embodiment shown in FIGS. 3 and 4, the second NFC antenna 123 provided in the second seating portion 220 may be electrically connected to the third NFC controller 306 located in the third seating portion 330.

The third NFC antenna 333 may transmit information acquired by wirelessly performing data communication with the electronic device E seated on the third seating portion 330 to the second NFC controller 106. The second NFC controller 106 may cause the third inverter controller 302 to control the third inverter 304 to perform an operation corresponding to the type of the electronic device E seated on the third seating portion 330. That is, the third inverter controller 302 may control the third inverter 304 to adjust the induced current generated from the third coil 331 based on information acquired by the third NFC antenna 333. With the third NFC antenna 333, the home appliance 6 according to the embodiment of the disclosure may allow the third inverter 304 to be driven to correspond to the electronic device E seated on the third seating portion 330, so that the convenience of use may be increased.

Although the disclosure has been shown and described in relation to specific embodiments, it would be appreciated by those skilled in the art that changes and modifications may be made in these embodiments without departing from the principles and scope of the disclosure, the scope of which is defined in the claims and their equivalents

What is claimed is:

1. A home appliance comprising:
   a case having a first seating portion and a second seating portion which has a height lower than a height of the first seating portion and is spaced apart from the first seating portion in a vertical direction;
   a first coil arranged in the first seating portion and configured to generate induced current to the first seating portion;
   a second coil arranged in the second seating portion and configured to generate induced current to the second seating portion;
   a first inverter arranged in the first seating portion and to supply driving current to the first coil to cause the first coil to generate the induced current; and
   a second inverter arranged in the first seating portion and to supply driving current to the second coil to cause the second coil to generate the induced current.

2. The home appliance of claim 1, further comprising:
   a first inverter controller arranged in the first seating portion and configured to control the first inverter; and
   a second inverter controller arranged in the first seating portion and configured to control the second inverter.

3. The home appliance of claim 2, further comprising a foreign object detector arranged in the second seating portion and configured to detect a foreign object on the second seating portion,
   wherein the second inverter controller is configured to control the second inverter to block the induced current generated from the second coil based on information detected by the foreign object detector.

4. The home appliance of claim 3, further comprising a detector controller arranged in the first seating portion, the detector controller configured to control the foreign object detector, receive the information from the foreign object detector and transmit the information to the second inverter controller.

5. The home appliance of claim 2, further comprising a near field communication (NFC) antenna arranged in the second seating portion and configured to detect an electronic device seated on the second seating portion,
   wherein the second inverter controller controls the second inverter to adjust the induced current generated from the second coil based on information acquired by the NFC antenna.

6. The home appliance of claim 5, further comprising a NFC controller arranged in the first seating portion, the NFC controller configured to control the NFC antenna, receive the information from the NFC antenna and transmit the information to the second inverter controller.

7. The home appliance of claim 1, further comprising a fan arranged in the first seating portion and configured to cool the first coil and the second coil.

8. The home appliance of claim 7, wherein the first seating portion includes an inlet through which external air is suctioned by the fan, and the second seating portion includes an outlet through which the air introduced through the inlet is discharged.

9. The home appliance of claim 7, wherein an inside of the first seating portion is provided to communicate with an inside of the second seating portion.

10. The home appliance of claim 1, further comprising a heat sink configured to dissipate heat generated by the first inverter or the second inverter.

11. The home appliance of claim 1, wherein the second seating portion is attachable to or detachable from the first seating portion.

12. The home appliance of claim 11, wherein the first seating portion includes a first connector and the second seating portion includes a second connector electrically connectable to the first seating portion.

13. The home appliance of claim 1, further comprising:
    a third seating portion arranged between the first seating portion and the second seating portion, the third seating portion having a height lower than a height of the first seating portion; and a third coil arranged in the third seating portion and configured to generate induced current.

14. The home appliance of claim 13, further comprising:
    a foreign object detector arranged in the second seating portion and configured to detect a foreign object on the second seating portion;
    a near field communication (NFC) antenna arranged in the second seating portion and configured to detect a device seated on the second seating portion; and
    a detector controller arranged in the third seating portion and configured to control the foreign object detector and an NFC controller arranged in the third seating portion and configured to control the NFC antenna.

15. The home appliance of claim 1, further comprising a foreign object detector arranged in the first seating portion and configured to detect a foreign object on the first seating portion, and a near field communication (NFC) antenna arranged in the first seating portion and configured to detect a device seated on the first seating portion.

16. A home appliance comprising:
    a case having a first seating portion and a second seating portion which has a height lower than a height of the first seating portion and is spaced apart from the first seating portion in a vertical direction;

a first coil arranged in the first seating portion, the first coil configured to generate induced current to the first seating portion;

a second coil arranged in the second seating portion, the second coil configured to generate induced current to the second seating portion;

a first inverter arranged in the first seating portion and to supply driving current to the first coil to cause the first coil to generate the induced current;

a second inverter arranged in the first seating portion and to supply driving current to the second coil to cause the second coil to generate the induced current;

a wireless module arranged in one of the first seating portion or the second seating portion, and configured to detect a wireless device when the wireless device is seated on the one of the first seating portion and the second seating portion; and a processor configured to control one of the first inverter and the second inverter, corresponding to the one of the first seating portion and the second seating portion, to adjust an amount of the driving current to wirelessly supply power to the wireless device when the wireless device is detected, or to heat a cooking vessel when the cooking vessel is seated on the one of the first seating portion and the second seating portion.

17. The home appliance of claim 16, wherein the wireless module is arranged in an other one of the first seating portion and the second seating portion, and configured to detect the wireless device when the wireless device is seated on the other one of the first seating portion and the second seating portion; and a processor configured to control an other one of the first inverter and the second inverter, corresponding to the other one of the first seating portion and the second seating portion, to adjust an amount of the driving current to wirelessly supply power to the wireless device when the wireless device is detected, or to heat the cooking vessel when the cooking vessel is seated on the other one of the first seating portion and the second seating portion.

* * * * *